United States Patent

Wang

(10) Patent No.: US 9,176,368 B2
(45) Date of Patent: Nov. 3, 2015

(54) OPTICAL SYSTEM

(71) Applicant: DELTA ELECTRONICS, INC., Taoyuan Hsien (TW)

(72) Inventor: Bor Wang, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 205 days.

(21) Appl. No.: 13/959,812

(22) Filed: Aug. 6, 2013

(65) Prior Publication Data

US 2014/0198303 A1    Jul. 17, 2014

(30) Foreign Application Priority Data

Jan. 17, 2013  (TW) .............................. 102101731 A

(51) Int. Cl.
*G03B 21/20* (2006.01)
*H04N 9/31* (2006.01)
*G03B 21/00* (2006.01)

(52) U.S. Cl.
CPC ............ *G03B 21/204* (2013.01); *G03B 21/005* (2013.01); *G03B 21/208* (2013.01); *H04N 9/3161* (2013.01)

(58) Field of Classification Search
CPC ............. G03B 21/204; G03B 21/2013; G03B 21/2006; G03B 21/202; G03B 21/20206; G03B 21/2033; G03B 21/006; G03B 21/008; G03B 21/2026; G03B 21/208; H04N 9/3161; H04N 9/3164; H04N 9/3197
USPC .......................................................... 353/84
See application file for complete search history.

(56) References Cited

U.S. PATENT DOCUMENTS

| | | | |
|---|---|---|---|
| 5,701,210 A | 12/1997 | Ohtaki | |
| 7,059,731 B2 | 6/2006 | Lee et al. | |
| 7,101,436 B2 | 9/2006 | Taniguchi et al. | |
| 7,330,314 B1 | 2/2008 | Cobb | |
| 8,169,672 B2 | 5/2012 | Yamauchi et al. | |
| 2007/0002282 A1 | 1/2007 | Chen et al. | |
| 2007/0273798 A1 | 11/2007 | Silverstein et al. | |
| 2011/0187999 A1 | 8/2011 | Hirata et al. | |
| 2011/0249242 A1* | 10/2011 | Saitou et al. .................... 353/98 |

(Continued)

FOREIGN PATENT DOCUMENTS

| | | |
|---|---|---|
| CN | 100432748 | 11/2008 |
| CN | 101493207 | 7/2009 |

(Continued)

*Primary Examiner* — William C Dowling
*Assistant Examiner* — Ryan Howard
(74) *Attorney, Agent, or Firm* — Grossman, Tucker, Perreault & Pfleger, PLLC

(57) ABSTRACT

An optical system for a projector is provided, which includes a solid-state light source module, an optical module, a phosphor element and a light relay module which are disposed sequentially. The light source module can generate a first beam, while the optical module can relay and uniformize the first beam so that the first beam is uniformly incident on the phosphor element. The optical module also makes the light spot of the first beam incident on the phosphor element into a predetermined shape and area, so that the phosphor element will emit a second beam by an emitting area. The light relay module can receive a part of the second beam, and the part of the second beam has a solid angle. An Etendue defined by the solid angle and the emitting area may be identical to the Etendue of a light modulator of the projector.

15 Claims, 6 Drawing Sheets

(56) References Cited

U.S. PATENT DOCUMENTS

| | | | |
|---|---|---|---|
| 2012/0162614 A1 | 6/2012 | Kobayashi et al. | |
| 2013/0222772 A1* | 8/2013 | Matsubara | 353/31 |

FOREIGN PATENT DOCUMENTS

| | | |
|---|---|---|
| JP | 2002-287085 | 10/2002 |
| JP | 2005-116266 | 4/2005 |
| JP | 2006-527416 | 11/2006 |
| JP | 2008-293958 | 12/2008 |
| JP | 2009-538448 | 11/2009 |
| JP | 2010-513948 | 4/2010 |
| JP | 2010-520498 | 6/2010 |
| JP | 2011-197597 | 10/2011 |
| JP | 2012-118110 | 6/2012 |
| TW | 200400365 | 1/2004 |
| TW | 201224632 | 6/2012 |
| WO | 2008/073105 | 6/2008 |
| WO | WO 2012066654 A1 * | 5/2012 |

* cited by examiner

OPTICAL SYSTEM

CROSS-REFERENCES TO RELATED APPLICATIONS

This application claims priority to Taiwan Patent Application No. 102101731 filed on Jan. 17, 2013, which is hereby incorporated herein by reference in its entirety.

BACKGROUND OF THE INVENTION

1. Field of the Invention

The present invention provides an optical system, and more particularly, to an optical system for a projector.

2. Descriptions of the Related Art

Currently, more projectors are adopting a solid-state light source module in combination with a phosphor element in an optical system thereof to generate light of different colors. FIG. 1 shows that in such an optical system, a solid-state light source module 10A has a plurality of laser diodes 11A. Each of the laser diodes HA is adapted to generate a laser beam 12A respectively. The laser beams 12A are then converged by a lens 13A onto a phosphor element 20A so that the phosphor element 20A is excited to emit light beams 21A of a specific color (i.e. wavelength). However, this kind of optical system has at least the following two shortcomings.

First, the laser beams 12A that are converged by the lens 13A and the converged laser beams 12A are incident onto the phosphor element 20A, and the light intensity on phosphor element 20A could be not uniform because the laser beams 12A could be not well aligned in practical manufacture. In other words, some regions of the phosphor element 20A are irradiated by more of the laser beams 12A, while some other regions are irradiated by less of the laser beams 12A. In the regions of the phosphor element 20A that are irradiated by more of the laser beams 12A, the higher temperature may decrease the exciting efficiency of the phosphor element 20A. That is, the exciting efficiency of the phosphor on the phosphor element may degrade as the temperature increases and cannot achieve the optimal exciting efficiency.

Additionally, a light spot of the laser beams 12A incident on the phosphor element 20A is not appropriately designed in terms of the shape and area thereof. This often leads to an overlarge emission area of the phosphor element 20A. That is, the Etendue of emission light of the phosphor element 20A becomes larger than what is acceptable for the light modulator (not shown) of the projector. As a consequence, light is lost because a part of the excited light beams 21A cannot be utilized by the light modulator. It shall be appreciated that the Etendue is defined as the product of a light source area and the divergence solid angle and is used to represent the geometric properties of an optical system.

To make improvements on the aforesaid two shortcomings, the positions of the individual laser diodes 11A as well as the angles and directions of the laser beams 12A must be precisely tailored and, further, all optical components between the laser diodes 11A and the phosphor element 20A must be precisely aligned. With precise alignment, the laser beams 12A can be uniformly incident on the phosphor element 20A and form a light spot of an appropriated shape and an appropriate area on the phosphor element 20A. However, this consumes time and costs and is difficult to control in practice, which is unfavorable for the production of the projector. Therefore, cheap projectors will have phosphor elements with poor exciting efficiencies and big production tolerance, and will not be able to make optimal exciting efficiency of phosphor and efficient use of the excited light beams.

Accordingly, a need exists in the art to provide an optical system that can make an improvement on at least one of the aforesaid shortcomings.

SUMMARY OF THE INVENTION

An objective of the present invention is to provide an optical system in which a phosphor element can easily have a good exciting efficiency.

Another objective of the present invention is to provide another optical system by which a projector can efficiently utilize the light excited from the phosphor element.

To achieve one of the aforesaid objectives, an optical system disclosed in the present invention can be used in a projector. The optical system comprises the following components: a solid-state light source module for generating a first light beams; an optical module that is disposed on the side of the solid-state light source module; a phosphor element that is disposed on the side of the optical module, wherein the optical module is disposed between the solid-state light source module and the phosphor element in a light path; and a light relay module that is disposed on the side of the phosphor element, wherein the phosphor element is disposed between the optical module and the light relay module in the light path; wherein, the optical module is used for relaying and uniformizing the first light beams so that the first light beams is uniformly incident on the phosphor element. The optical module is also used for making the light spot of the first light beams incident on the phosphor element with a predetermined shape and predetermined area so that the phosphor element emits the second light beams in the emitting area; wherein, the light relay module is used for receiving a part of the second light beams. The part of the second light beams has a solid angle; wherein, an Etendue defined by the solid angle and the emitting area is substantially identical to the acceptable Etendue of a light modulator of the projector.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
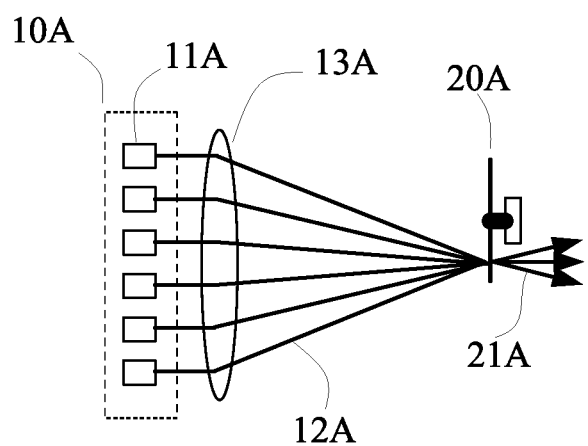
FIG. 1 is a schematic plan view of a conventional optical system.
Figure 2:
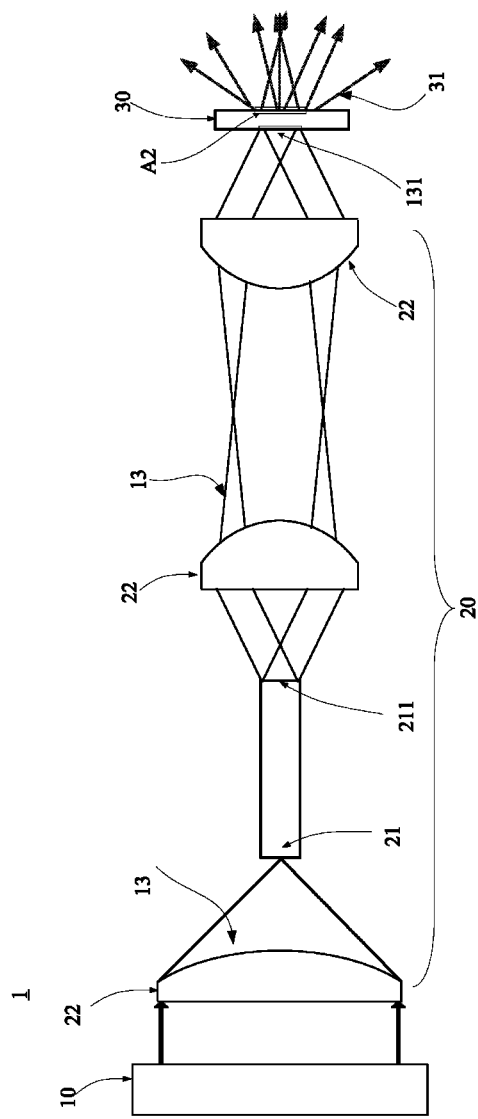
FIG. 2 is a schematic plan view of an optical system according to the first embodiment of the present invention.
Figure 3:
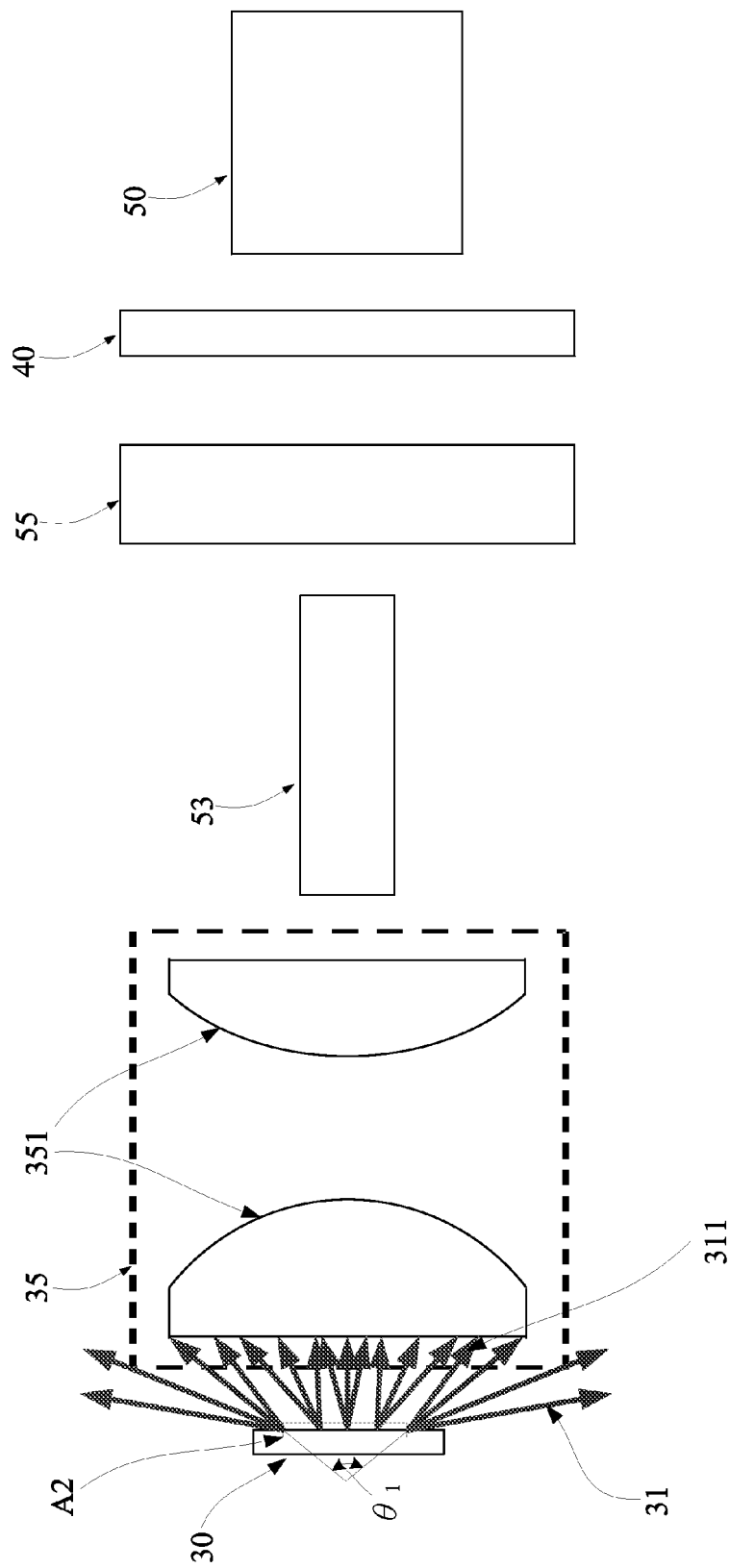
FIG. 3 is another schematic plan view of the optical system according to the first or the second embodiment of the present invention.

FIGS. 2 and 3 show two schematic plan views of an optical system according to the first embodiment of the present invention respectively. In the first embodiment of the present invention, an optical system 1 is proposed. The optical system 1 can be used in a projector and may be considered as a part of the projector. The optical system 1 comprises a solid-state light source module 10, an optical module 20, a phosphor element 30, and a light relay module 35. In addition, a light modulator 40, a projection lens 50, a light uniformizing element 53 or a light relaying module 55 and other components of the projector that are to be described later may also be considered to be comprised in the optical system 1.

In general, the solid-state light source module 10, the optical module 20, the phosphor element 30 and the light relay module 35 are disposed sequentially. That is, the optical module 20 is disposed at a side (e.g., the back side) of the solid-state light source module 10, the phosphor element 30 is disposed at a side (e.g., the back side) of the optical module 20, and the light relay module 35 is disposed at a side (e.g., the back side) of the phosphor element 30. Thus, the optical module 20 is disposed between the solid-state light source module 10 and the phosphor element 30 in a light path, while the phosphor element 30 is disposed between the optical module 20 and the light relay module 35 in the light path.

Further technical features of the solid-state light source module 10, the optical module 20, the phosphor element 30, the light relay module 35 and the light modulator 40 and the like are sequentially described as follows.

Figure 4:
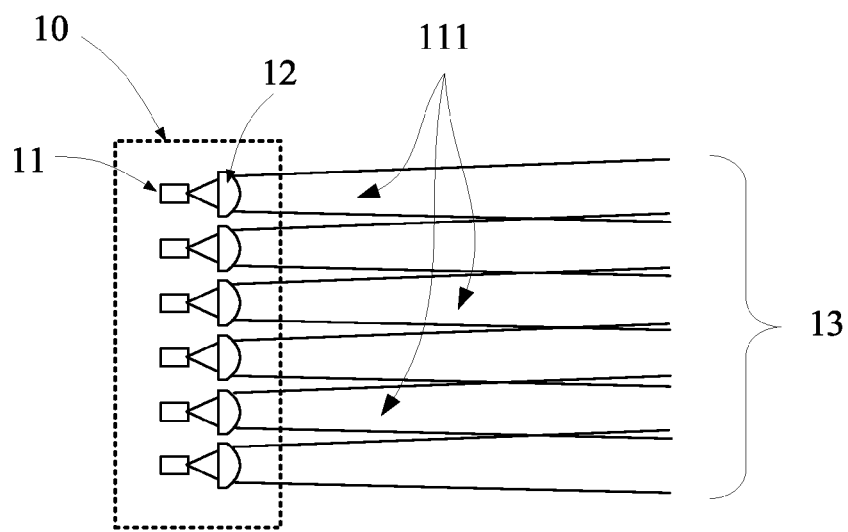
FIG. 4 is a schematic plan view of a solid-state light source module of the optical system of FIG. 2.

FIG. 4 is a schematic plan view of the solid-state light source module of the optical system of FIG. 2. The solid-state light source module 10 may have a plurality of solid-state light sources 11. Each of the solid-state light sources 11 may be a laser diode or a light-emitting diode, and in this embodiment, is illustrated as a laser diode. The solid-state light source module 10 may further optionally comprise a plurality of collimator lenses 12. The collimator lenses 12 are disposed at a side of the solid-state light sources 11 respectively to receive light beams 111 emitted from the solid-state light sources 11 so that the light beams 111 can be more collimated. Moreover, the solid-state light sources 11 are further disposed in such a way that the emitted light beams 111 have a good parallelism.

The light beams 111 generated by the solid-state light sources 11 can be collectively viewed as a first beam 13. In other words, the solid-state light source module 10 as a whole can generate a first beam 13 by the solid-state light sources 11. Since all the light beams 111 are well collimated, the first beam 13 as a whole is also well collimated.

With reference to FIG. 2, the optical module 20 can relay and uniformize the first beam 13, and may have an integration rod 21 and at least one relay lens 22. Here, three relay lenses 22 are shown for illustration.

The first beam 13 can be converged and relayed to the integration rod 21 by a first relay lens 22 to be uniformized by the integration rod 21. That is, when passing through the integration rod 21, the first beam 13 is reflected or total internal reflected in the integration rod 21 so that the light intensity of the first beam 13 exiting from the integration rod 21 is relatively uniform. It should be appreciated that the integration rod 21 may be of a solid or hollow structure.

Subsequently, the first beam 13 that has been uniformized is relayed to the phosphor element 30 by a second and third relay lens 22. The phosphor element 30 may be a fixed phosphor plate or a rotary phosphor wheel, and may either be a transmissive phosphor element or a reflective phosphor element.

Figure 5:
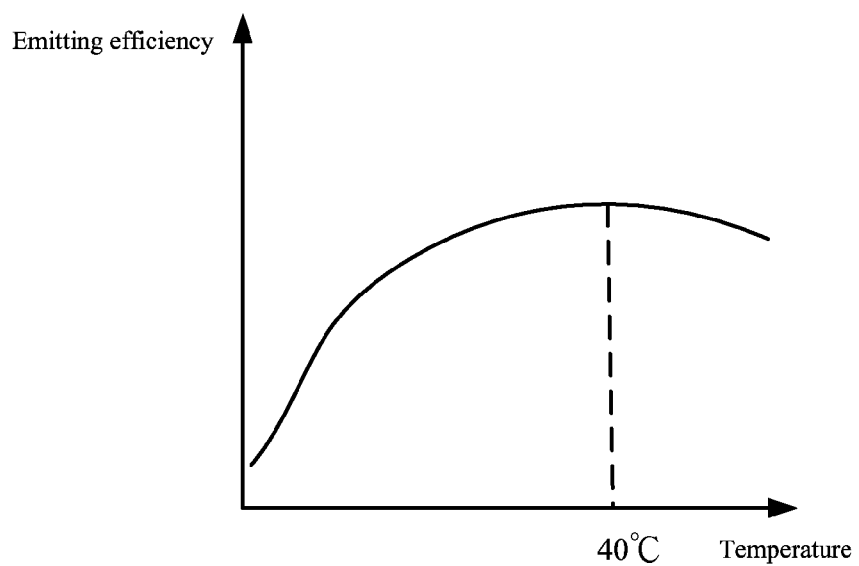
FIG. 5 is a schematic diagram illustrating the temperature versus the emitting efficiency of a phosphor element of the optical system of FIG. 2.

The first beam 13 is uniformly incident on the phosphor element 30, so the degradation in the exciting efficiency of the phosphor element 30 resulting from the increased temperature is minimized. FIG. 5 is a schematic diagram illustrating the temperature versus the emitting efficiency of the phosphor element of the optical system of FIG. 2. In particular, the maximum emitting efficiency of the phosphor element 30 corresponds to a specific temperature which is, for example, about 40 degrees (which is only for illustration). When the first beam 13 is uniformly incident on the phosphor element 30, the temperature of the phosphor element 30 will not exceed the specific temperature easily, so the degradation in the exciting efficiency thereof resulting from the increased temperature can be minimized.

The exciting efficiency degradation cannot only caused by temperature, the higher laser pumping power intensity, the lower exciting efficiency. So the more uniform laser light incident on the phosphor the lower laser power intensity, which is also helpful on getting better exciting efficiency of phosphor.

Figure 6:
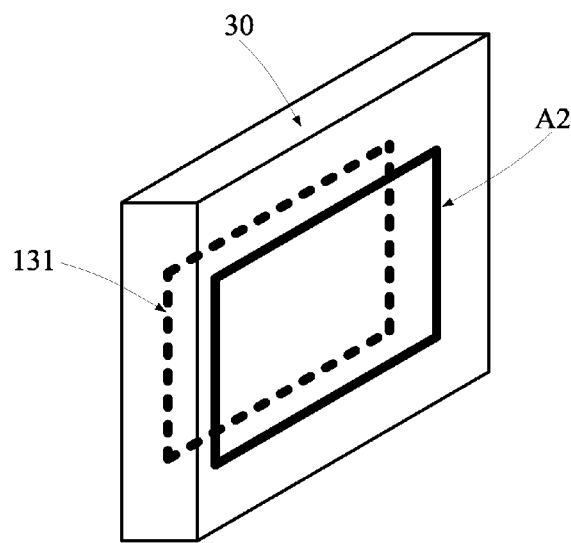
FIG. 6 is a schematic view illustrating the light spot of a first light beam and the phosphor element of the optical system of FIG. 2.

With reference to FIG. 2 and FIG. 6, FIG. 6 is a schematic view illustrating a light spot of the first beam and the phosphor element of the optical system of FIG. 2. In addition to making the first beam 13 uniformly incident on the phosphor element 30, the optical module 20 can further make the light spot 131 of the first beam 13 incident on the phosphor element 30 have a predetermined area (i.e., a predetermined size) and a predetermined shape.

Figure 7:
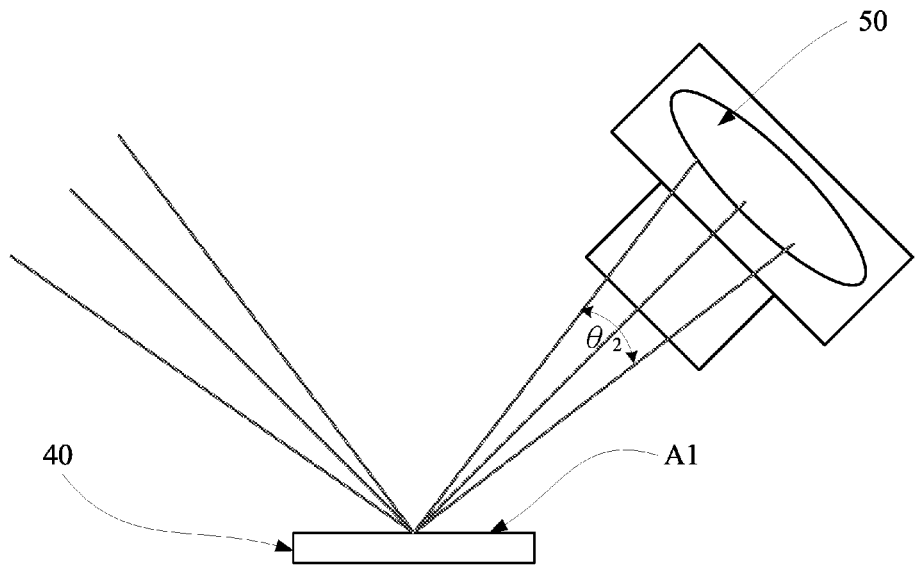
FIG. 7 is a schematic plan view of a light modulator and a projection lens according to the first embodiment of the present invention.

The predetermined shape of the light spot 131 is designed to be identical to (or similar to) the shape of the light modulator 40 (as shown in FIG. 7). Therefore, if the light modulator 40 is in a rectangular shape, then the predetermined shape of the light spot 131 is identical to or similar to the rectangular shape.

The predetermined shape of the light spot 131 is associated with the shape of an output aperture 211 of the integration rod 21. In particular, the first beam 13 passing through the integration rod 21 is not only uniformized but also shaped by the integration rod 21 to make the sectional shape of the first beam 13 along the main optical axis identical to or similar to the shape of the output aperture 211 of the integration rod 21.

Then, if the phosphor element 30 is perpendicular to the main optical axis of the first beam 13, the predetermined shape of the light spot 131 after being shaped is identical to the shape of the output aperture 211 of the integration rod 21. However, if the phosphor element 30 is inclined to the main optical axis of the first beam 13, the predetermined shape of the light spot 131 after being shaped is not identical to the shape of the output aperture 211 of the integration rod 21, but is identical to the shape of "the output aperture 211 of the integration rod 21 that is projected onto the phosphor element 30 along the main optical axis of the first beam 13".

For example, if the predetermined shape of the light spot 131 is required to be a rectangular shape (the aspect ratio of which is 4:3), then, when the phosphor element 30 is perpendicular to the main optical axis of the first beam 13, the output aperture 211 of the integration rod 21 may be designed into the same rectangular shape. However, if the phosphor element 30 is inclined to the main optical axis of the first beam 13, the output aperture 211 of the integration rod 21 is designed into a different rectangular shape (the aspect ratio of which is not 4:3).

The predetermined area of the light spot 131 is associated with the "area of the output aperture 211 of the integration rod 21" and "the magnification of the relay optics from rod to phosphor element (herein the relay optics is lens 22)." In particular, when the phosphor element 30 is perpendicular to the main optical axis of the first beam 13, the area of the light spot 131 is defined as "the product of the area of the output aperture 211 and the magnification of the relay lens 22".

Therefore, the predetermined area of the light spot 131 can be obtained by adjusting the area of the output aperture 211 and/or the magnification of the relay lens 22.

When the phosphor element 30 is inclined to the main optical axis of the first beam 13, not only "the product of the area of the output aperture 211 and the magnification of the relay lens 22" is considered, but also "the angle included between the phosphor element 30 and the main optical axis of the first beam 13" shall be considered in determination of the predetermined area of the light spot 131 to obtain the desired area of the light spot 131.

When the first beam 13 is incident on the phosphor element 30 with the light spot 131 having the predetermined area and determined shape, the phosphor element 30 can emit a second beam 31 in an emitting area A2.

With reference to FIG. 3, the light relay module 35 may comprise at least one lens 351, and in this embodiment, two lenses 351 are shown for illustration. The light relay module 35 can receive a part 311 of the second beam 31. That is, not all the second beam 31 is received by the light relay module 35, and the light rays outside of the receiving range of the light relay module 35 will not enter the light relay module 35. The part 311 of the second beam 31 has a solid angle $\theta_1$. The solid angle $\theta_1$ corresponds to the light receiving ability of the light relay module 35; that is, the greater the part 311 of the second beam 31 that can be received by the light relay module 35, the larger the solid angle $\theta_1$ of the part 311 of the second beam 31.

An Etendue $E_p$ can be defined as the product of "the solid angle $\theta_1$ of the part 311 of the second beam 31" and "the emitting area A2 of the phosphor element 30"; that is, $E_p = A2\ \theta_1$. The Etendue $E_p$ defined by the solid angle $\theta_1$ and the emitting area A2 is substantially equal to a usable Etendue $E_m$ of the light modulator 40 of the projector. Thus, when the part 311 of the second beam 31 is then relayed to the light modulator 40 via the light uniformizing element 53 (e.g., an integration rod or a light pipe) and the light relaying module 55, the light modulator 40 can make sufficient use of the part 311 of the second beam 31 to reduce the light loss thereof.

FIG. 7 is a schematic plan view of the light modulator and the projection lens according to the first embodiment of the present invention. The light modulator 40 may be a digital micromirror device (DMD), a liquid crystal on silicon device (LCoS) or a liquid crystal device (LCD). The light modulator 40 has a modulator area A1 and a numeral aperture (NA). The numeral aperture NA is associated with a usable-light (i.e., receivable light) solid angle $\theta_2$ of the light modulator 40, and is further associated with an F-number of a projection lens 50 of the projector. The relationship there between is $\theta_2 = \pi(1/\text{F-number})^2$. Therefore, when the projection lens 50 is relatively large and the F-number is relatively small, the usable-light solid angle $\theta_2$ of the light modulator 40 increases. The Etendue $E_m$ of the light modulator 40 is a function of the modulator area A1 and the usable-light solid angle $\theta_2$. For example, the Etendue $E_m$ may be defined as the product of the modulator area A1 and the usable-light solid angle $\theta_2$; that is, $E_m = A1\ \theta_2$.

With reference to FIG. 3 and FIG. 6, as the Etendue $E_m$ of the light modulator 40 is known, the Etendue $E_p$ defined by "the solid angle $\theta_1$ of the part 311 of the second beam 31" and "the emitting area A2 of the phosphor element 30" can be determined so that the desired values of the solid angle $\theta_1$ and the emitting area A2 are determined. The user may first select the desired value of one of the solid angle $\theta_1$ and the emitting area A2, and then derive the desired value of the other. In brief, after the Etendue $E_m$ of the light modulator 40 is known, the desired emitting area A2 of the phosphor element 30 can be determined.

Since the emitting area A2 of the phosphor element 30 is associated with the predetermined area of the light spot 131 of the first beam 13, the predetermined area of the light spot 131 can be determined once the desired emitting area A2 is known. Then, the area of the output aperture 211 of the integration rod 21 and/or the magnification of the relay lens 22 are determined.

Usually, the predetermined area of the light spot 131 may be equal to the desired emitting area A2 of the phosphor element 30. For example, if the desired emitting area A2 of the phosphor element 30 is 20 mm$^2$, the predetermined area of the light spot 131 may also be 20 mm$^2$ Preferably, the predetermined area of the light spot 131 is slightly smaller than the desired emitting area A2 of the phosphor element 30 in consideration of the following factors: the emitting area A2 is in general slightly larger than the irradiation area (i.e., the predetermined area of the light spot 131) due to the thickness of the phosphor element 30, so having the emitting area A2 equal to the predetermined area of the light spot 131 requires that the emitting area A2 exceeds the desired value and, thus, the predetermined area of the light spot 131 needs to be slightly reduced.

According to the above descriptions, the predetermined area of the light spot 131 is defined by the Etendue $E_m$ of the light modulator 40 and the emitting area A2 of the phosphor element 30, and is achieved by adjusting the parameters (e.g., the area of the output aperture 211 of the integration rod 21 and/or the magnification of the relay lens 22) of the optical module 20.

Figure 8:
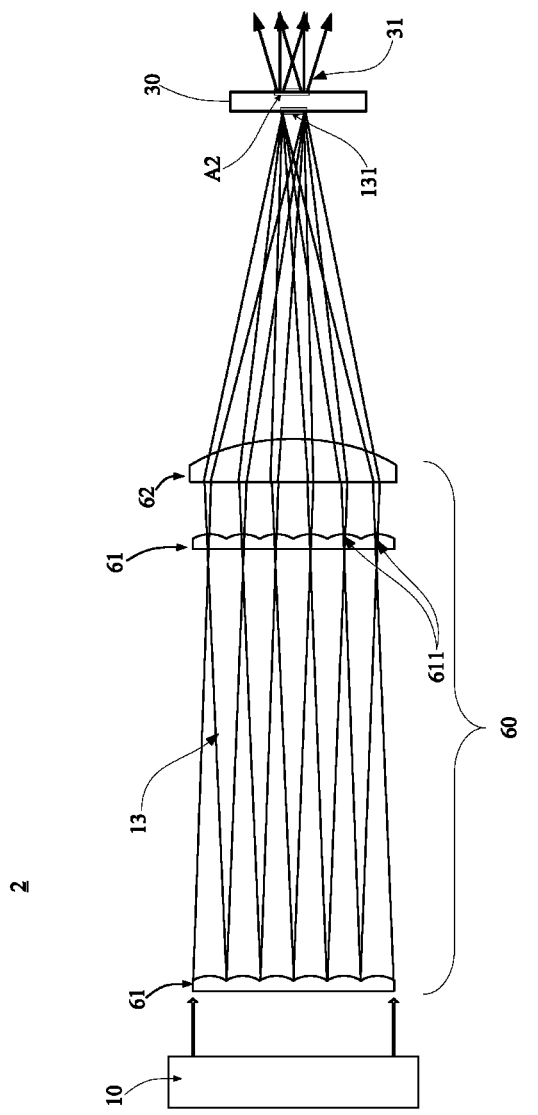
FIG. 8 is a schematic plan view of the optical system according to the second embodiment of the present invention.

FIG. 8 is a schematic plan view of the optical system according to the second embodiment of the present invention. In the second embodiment of the present invention, another optical system 2 is proposed. The optical system 2 is different from the optical system 1 in that the optical system 2 comprises an optical module 60 implemented in a different form.

In detail, the optical module 60 has two lens arrays or fly eye arrays 61 and at least one relay lens 62. The two lens arrays 61 may be disposed at a side (e.g., the front side) of the relay lens 62, and each of the two lens arrays 61 has a plurality of lenses 611. In this embodiment, one relay lens 62 is shown for illustration.

The first beam 13 generated by the solid-state light source module 10 can be directly relayed to the two lens arrays 61 and relay lens 62. Then the light 31 can be converged onto phosphor element 30 as a uniformized and shaped light spot 131, the shape is same with the lens 611, the spot size is determined by the magnification of the optics composed by the two lens arrays 61 and relay lens 62. As a result, a second beam 31 is emitted by the phosphor element 30 in an emitting area A2.

FIG. 3 illustrates the part 311 of the second beam 31 that can then be received by the light relay module 35. The Etendue $E_p$ defined by the solid angle $\theta_1$ of the part 311 of the second beam 31 and the emitting area A2 is substantially equal to the Etendue $E_m$ of the light modulator 40. In this way, as with the optical system 1, the light modulator 40 can also make sufficient use of the part 311 of the second beam 31 received by the light relay module 35 in the optical system 2.

Similar to the first embodiment, the predetermined shape of the light spot 131 is associated with the shape of the lenses 611 of the lens arrays 61. That is, the predetermined shape of the light spot 131 may be identical to the shape of the lenses 611 or "the shape of the lenses 611 projected onto the phosphor element 30 along the main optical axis of the first beam 13". The predetermined area of the light spot 131 is defined by the Etendues of the light modulator (not shown) and the phosphor element 30, and can be achieved by adjusting parameters (e.g., the area of the lenses 611 and/or the magnification of the relay lens 62) of the optical module 60.

It should be appreciated that the first beam 13 generated by the solid-state light source module 10 cannot be completely collimated, but still have some diffusion angle. The permissible value of the diffusion angle of the first beam 13 is associated with the parameters of the two lens arrays 61.

In detail, the lenses 611 of the two lens arrays 61 have a dimension (a) and a dimension (b) in a first direction and a second direction respectively. There is a distance (d) between the two lens arrays 61 in a third direction. The first, the second and the third directions are orthogonal to each other, while the third direction is parallel to the main optical axis of the first beam 13. The diffusion angle of the first beam 13 in the first direction should not exceed $\sin^{-1}(a/d)$, and the diffusion angle in the second direction should not exceed $\sin^{-1}(b/d)$. It should be appreciated that the focal length of each of the lenses 611 of the two lens arrays 61 is approximately equal to the distance (d) between the two lens arrays 61.

According to the above descriptions, the optical system disclosed in the present invention can make the first beam be uniformly incident on the phosphor element to form the light spot of the predetermined shape and area by simply using the optical module instead of using the time-consuming and cost-consuming conventional practice that has to precisely tailor the relative position of the solid-state light source. Therefore, with the optical system disclosed in the present invention, the phosphor element can easily have a good exciting efficiency. The projector can make good use of the light beams excited by the phosphor element.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An optical system for a projector, comprising:
    a solid-state light source module for generating a first light beam;
    an optical module, disposed at a side of the solid-state light source module, wherein the optical module comprises two lens arrays and at least one relay lens;
    a phosphor element, disposed at a side of the optical module, wherein the optical module is disposed between the solid-state light source module and the phosphor element in a light path; and
    a light relay module, disposed at a side of the phosphor element, wherein the phosphor element is disposed between the optical module and the light relay module in the light path;
        wherein, the optical module is used for relaying and uniformizing the first light beam so that the first light beam is uniformly incident on the phosphor element, the optical module is also used for making a light spot of the first light beam incident on the phosphor element have a predetermined shape and a predetermined area so that the phosphor element emits a second light beam in an emitting area;
        wherein, the light relay module is used for receiving a part of the second light beam, the part of the second light beam has a solid angle, and an Etendue defined by the solid angle and the emitting area is substantially identical to an Etendue of a light modulator of the projector.

2. The optical system of claim 1, wherein the Etendue defined by the solid angle and the emitting area is a product of the solid angle and the emitting area; the light modulator has a modulating area and a usable-light solid angle, and the Etendue of the light modulator is a product of the modulating area and the usable-light solid angle.

3. The optical system of claim 2, wherein the usable-light solid angle of the light modulator corresponds to an F-number of a projection lens of the projector.

4. The optical system of claim 1, wherein each of the two lens arrays comprises a plurality of lenses, and shapes of the lenses are identical to the light spot of the first light beam incident on the phosphor element.

5. The optical system of claim 1, wherein the light relay module comprises at least one lens.

6. The optical system of claim 1, wherein the solid-state light source module comprises a plurality of solid-state light sources which are LEDs or laser diodes.

7. The optical system of claim 1, wherein the light modulator is a digital micromirror device (DMD), a liquid crystal on silicon (LCoS) device or a liquid crystal device (LCD).

8. The optical system of claim 1, wherein the phosphor element is a fixed phosphor plate or a rotary phosphor wheel.

9. An optical system for a projector, comprising:
    a solid-state light source module for generating a first light beam;
    an optical module, disposed at a side of the solid-state light source module, wherein the optical module comprises an integration rod and at least one relay lens;
    a phosphor element, disposed at a side of the optical module, wherein the optical module is disposed between the solid-state light source module and the phosphor element in a light path; and
    a light relay module, disposed at a side of the phosphor element, wherein the phosphor element is disposed between the optical module and the light relay module in the light path;
        wherein, the optical module is used for relaying and uniformizing the first light beam so that the first light beam is uniformly incident on the phosphor element, the optical module is also used for making a light spot of the first light beam incident on the phosphor element have a predetermined shape and a predetermined area so that the phosphor element emits a second light beam in an emitting area;
        wherein, the light relay module is used for receiving a part of the second light beam, the part of the second light beam has a solid angle, and an Etendue defined by the solid angle and the emitting area is substantially identical to an Etendue of a light modulator of the projector;
        wherein a shape of an exit of the integration rod is identical to the light spot of the first light beam incident on the phosphor element.

10. The optical system of claim 9, wherein the Etendue defined by the solid angle and the emitting area is a product of the solid angle and the emitting area; the light modulator has a modulating area and a usable-light solid angle, and the Etendue of the light modulator is a product of the modulating area and the usable-light solid angle.

11. The optical system of claim 10, wherein the usable-light solid angle of the light modulator corresponds to an F-number of a projection lens of the projector.

12. The optical system of claim 9, wherein the light relay module comprises at least one lens.

13. The optical system of claim 9, wherein the solid-state light source module comprises a plurality of solid-state light sources which are LEDs or laser diodes.

14. The optical system of claim 9, wherein the light modulator is a digital micromirror device (DMD), a liquid crystal on silicon (LCoS) device or a liquid crystal device (LCD).

15. The optical system of claim 9, wherein the phosphor element is a fixed phosphor plate or a rotary phosphor wheel.

* * * * *